June 27, 1933.  A. DUBONNET  1,916,099

MUD GUARD SUSPENSION

Filed June 13, 1932

Inventor:
André Dubonnet
Attorney:

Patented June 27, 1933

1,916,099

UNITED STATES PATENT OFFICE

ANDRÉ DUBONNET, OF NEUILLY-SUR-SEINE, FRANCE

MUD GUARD SUSPENSION

Application filed June 13, 1932, Serial No. 616,993, and in Belgium March 25, 1932.

The present invention relates to mud guard suspensions, and, more particularly, to those of the type designed to be associated with steering wheels.

One of the objects of the invention is to provide a mud guard suspension permitting movement of the mud guards with the steering wheels.

Another object is to provide means for mounting a mud guard to turn with a steering wheel while following vertical displacements of the chassis only.

A further object is to provide means for mounting a mud guard to turn with a steering wheel so that projectors may be supported on the mud guard.

Still further objects will appear in the course of the detailed description now to be given with reference to the accompanying drawing, in which.

Figure 1:
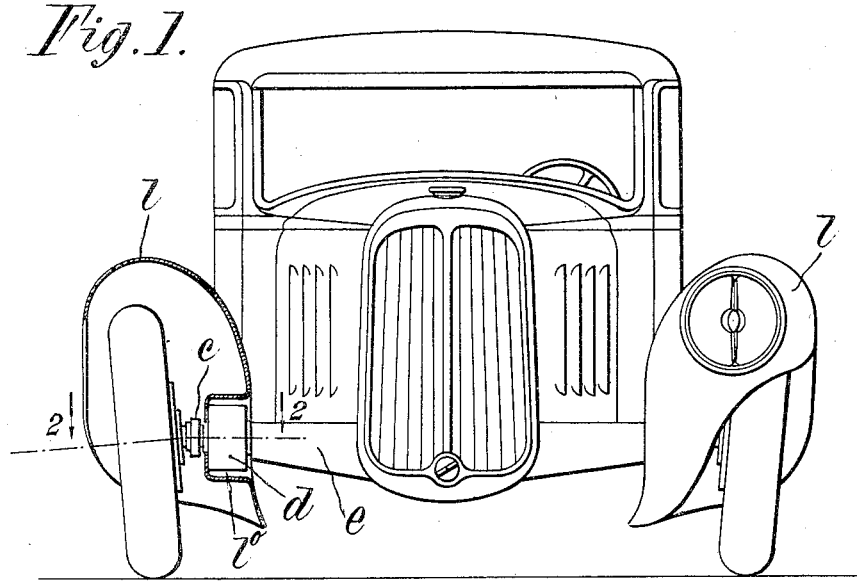
Figure 1 is a front elevation of one illustrative embodiment of the invention showing one of the mud guards as seen in a section taken on line 1—1 of Figure 2 to be described.

The present invention is applicable to vehicles in which an assembly is provided for independently suspending steering wheels from a chassis. This assembly includes a crank lever $c$ supporting the wheel spindle at one extremity and rotating inside a shock absorbing assembly mounted in a casing $d$, a vertical pivot $i$ permitting movement of casing $d$ in a substantially horizontal plane, and a transverse support $e$ rigidly connected to the chassis and articulating with casing $d$ through the intermediary of pivot $i$. Such an arrangement is more fully described in the applicant's copending application Serial No. 585,316, filed January 7, 1932. The mud guard forming the subject matter of the present invention is mounted in the manner shown in Figures 1 and 2 so as to be supported on casing $d$. The inner face of the mud guard is provided with a depression 1°. It will be noted that the casing $d$ lies within the mud guard while the vertical pivot $i$ lies outside the mud guard and within the depression 1°. A mud guard thus mounted is capable of following the turning movements of the steering wheel without following the vertical movements of the wheel spindle in amplitude, the shock absorbing assembly in casing $d$ transmitting only a fraction of the vertical displacements of the wheel to the mud guard. Mud guards which have been mounted to turn with the steering wheels have, hitherto, been supported to move with the wheel spindles and, at high speeds, have been subjected to considerable vibration. By mounting the mud guards in the manner hereinabove described, these vibrations are, in large part, eliminated.

Inasmuch as the mud guards move with the chassis, the usual projectors may be mounted directly thereon just as if they were mounted on the chassis and, since they follow the turning movements of the steering wheels, the vehicle operator will be able to benefit from the oscillating movement of the projectors when making turns.

Figure 2:
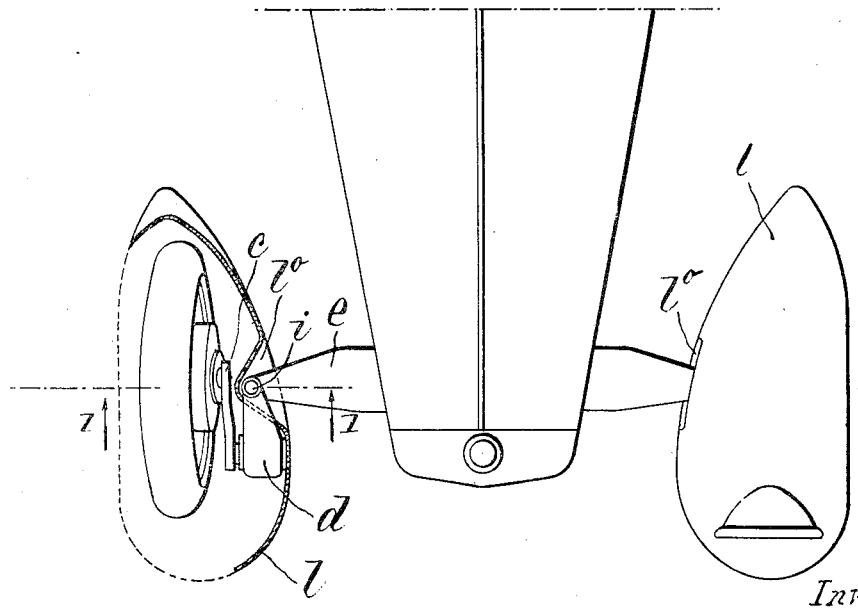
Figure 2 represents a plan view of the structure illustrated in Figure 1, one of the mud guards being shown in a section taken on line 2—2 of Figure 1.

Mud guards $l$ may be given a fusiform section tapering toward the rear as shown in Figure 2 in order to diminish wind resistance and may also be formed so that the space therebetween and the vehicle body or chassis has a Venturi form (Fig. 2) whose section increases toward the rear of the vehicle this Venturi section not only facilitating extreme turning movements but also diminishing the resistance to forward advancement.

What I claim is:—

1. In combination with a wheel suspension including a transverse support, an element pivotally connected to said support to turn about a substantially vertical axis, a wheel, and shock absorbing means to support said wheel on said element while permitting the wheel to move vertically with respect to the element, a mud guard supported on said element and movable therewith, whereby said mud guard turns with said wheel but is not moved vertically by vertical movement of said wheel with respect to said element.

2. In combination with a wheel suspension including a transverse support, an element pivotally connected to said support to turn about a substantially vertical axis, a wheel, and shock absorbing means to support said wheel on said element while permitting the wheel to move vertically with respect to the element, a mud guard supported on said element and movable therewith, whereby said mud guard turns with said wheel but is not moved vertically by vertical movement of said wheel with respect to said element, said element lying within the mud guard and said vertical pivot lying outside the mud guard.

3. In combination with a wheel suspension including a transverse support, an element pivotally connected to said support to turn about a substantially vertical axis, a wheel, and shock absorbing means to support said wheel on said element while permitting the wheel to move vertically with respect to the element, a mud guard supported on said element and movable therewith, whereby said mud guard turns with said wheel but is not moved vertically by vertical movement of said wheel with respect to said element, said mud guard having a depression on its inner face, said element lying within the mud guard and said vertical pivot lying outside the mud guard and within said depression.

In testimony whereof I affix my signature.

ANDRÉ DUBONNET.